United States Patent
Bathurst

[11] Patent Number: 5,996,542
[45] Date of Patent: Dec. 7, 1999

[54] ROTARY SHAFT SEALING SYSTEM

[75] Inventor: Shane Bathurst, Peterborough, United Kingdom

[73] Assignee: Perkins Engines Company Limited, Peterborough, United Kingdom

[21] Appl. No.: 09/094,946

[22] Filed: Jun. 15, 1998

[30] Foreign Application Priority Data

Jun. 21, 1997 [GB] United Kingdom ............... 9713045

[51] Int. Cl.$^6$ .............................. F16J 15/00; F01M 9/10
[52] U.S. Cl. ...................... 123/90.37; 277/351; 277/421
[58] Field of Search .................... 277/591, 313, 277/596, 592, 594, 350, 351, 411, 412, 421; 123/90.37, 196 R; 184/6.5

[56] References Cited

U.S. PATENT DOCUMENTS

| | | | |
|---|---|---|---|
| 2,621,087 | 12/1952 | Kluge | 277/347 |
| 3,331,609 | 7/1967 | Moran | 277/567 |
| 3,586,342 | 6/1971 | Staab | 277/559 |
| 5,025,917 | 6/1991 | Smith et al. | 198/842 |
| 5,201,529 | 4/1993 | Heinzen | 277/351 |
| 5,228,700 | 7/1993 | Biesold et al. | 277/25 |
| 5,244,215 | 9/1993 | Cather, Jr. et al. | 277/309 |
| 5,421,592 | 6/1995 | Petrak | 277/349 |
| 5,462,288 | 10/1995 | Hering et al. | 277/565 |
| 5,588,656 | 12/1996 | Matsushima | 277/575 |
| 5,648,614 | 7/1997 | Martsfeld | 73/706 |
| 5,713,579 | 2/1998 | Petrak et al. | 277/353 |

FOREIGN PATENT DOCUMENTS

| | | |
|---|---|---|
| 1056016 | 1/1967 | United Kingdom . |
| 1191672 | 5/1970 | United Kingdom . |
| 1259935 | 1/1972 | United Kingdom . |
| 2058956 | 4/1981 | United Kingdom . |
| 2082271 | 3/1982 | United Kingdom . |

OTHER PUBLICATIONS

*Design News*, "Rotating Seal Deflects Dirt and Debris", Dec. 1996, p. 58, John Lewis.

*Primary Examiner*—Willis R. Wolfe
*Assistant Examiner*—Hai Huynh
*Attorney, Agent, or Firm*—Nilles & Nilles SC

[57] ABSTRACT

The invention relates to a flinger device for preventing the ingress of foreign matter such as dust or grit to the vicinity of a contact surface between a rotary shaft lubricant seal and the shaft. The device is adapted to locate on an end of the shaft and has a radially extending flange portion which fits closely adjacent to a radially extending outer end surface for retaining the seal in contact with the shaft. The device also has an axially extending wall part whose outer circumferential surface locates closely adjacent to an axially extending inner surface of the seal retainer. The surfaces of the flange portion and wall part of the device co-operate to prevent or at least restrict the ingress of foreign matter to the vicinity of the seal/shaft contact surface.

21 Claims, 3 Drawing Sheets

ROTARY SHAFT SEALING SYSTEM

BACKGROUND OF THE INVENTION

1. Field of the Invention

The present invention relates to a rotary shaft sealing system and, in particular, to a flinger device for preventing the ingress of foreign matter to a side of a bearing surface between a rotary shaft seal and its associate shaft.

Housing-mounted rubber-lipped seals are a generally efficient form of sealing rotating shafts in order to prevent oil leaking from internal combustion engines. These seals usually comprise a circular metal housing into which is moulded a rubber seal having two lips, an inner shaft-contacting and spring-assisted lip and an outer non-contacting, non-spring-assisted, lip.

The seal is fitted to a shaft in the engine so that an inner lip faces an oil (lubricated) side of the shaft to contain the oil within the engine and an outer lip faces away from the engine to provide some protection from the ingress of foreign matter to the vicinity of the inner lip and the moving (bearing) surface against which it seals. A surface of the inner lip presses against a smooth peripheral surface of the rotating shaft and may have a scroll moulded into its surface to cause oil to wind towards the engine side of the seal as the shaft rotates. It is commonplace for a seal of this type to be fitted at each end of the crankshaft.

The front end of an engine usually benefits from a labyrinth sealing system provided by the shaped rear face of the crankshaft-mounted pulley closely following that of the adjacent front face of the engine. This, and the centrifugal effect of the rotating pulley on the surrounding air, assists in directing dirt, which can be in dry, airborne form or may be thrown up as a wet slurry, away from the front oil seal. Front seal wear from abrasives is therefore not generally a problem.

In dirty operating environments, a crankshaft oil seal fitted at the rear end of an engine may suffer from dirt ingress to a greater extent than a seal fitted at the front end. This is particularly true where the engine is used as an open power unit and the rear end does not have the protection of a flywheel housing or a clutch housing. In these situations, abrasive foreign matter can access the seal to crankshaft contact area and wear both the seal and the corresponding surface of the crankshaft. The wear to the crankshaft may be exacerbated by abrasive particles becoming embedded in the relatively soft rubber of the seal.

A known method of protecting the crankshaft and other shaft seals is to provide a 'flinger' device adjacent the 'dirty' side of the seal which rotates with the shaft. The flinger device is generally circular with a diameter exceeding that of the seal and it serves to throw out abrasives, by centrifugal action, in a similar manner to the crankshaft pulley at the front end of the crankshaft.

There are disadvantages with the use of flinger devices. Firstly, flinger devices which fit closely adjacent to the seal but are non-contacting with surrounding surfaces, do not fully protect the seal and bearing surface from airborne abrasive foreign matter when the engine is running. Nor do they protect the seal when the engine is not operating at which time abrasive dirts or slurries can run down the engine block, etc, into the vicinity of the crankshaft/seal bearing surface and become trapped, thus causing abrasion when the engine is operated again.

2. Descriptive of the Related Art

The problem of crankshaft rear seal wear in dirty operating environments has been previously discussed. On page 58 of the publication 'Design News' of Dec. 2, 1996 is disclosed an apparatus for protecting a crankshaft rear oil seal from external contamination. This apparatus comprises a preformed metal sleeve carrying an integral rubber lip. The apparatus is pressed onto the flange of the crankshaft and is therefore caused to correspondingly rotate during engine operation. The rubber lip part of the apparatus is in contact with an inner surface of the seal retaining housing and has the function of isolating the seal from sources of external contamination.

The seal protecting apparatus described in the aforementioned publication has the disadvantage that the rubber lip is itself directly exposed to abrasives in foreign matter and may suffer wear and embedding of abrasives in the relatively soft material of the lip, thus becoming progressively less effective.

OBJECTS AND SUMMARY OF THE INVENTION

It is an object of the present invention to provide a device which will more effectively protect a crankshaft rear end oil seal from abrasive dusts and slurries during static and dynamic engine operation.

It is a further object to provide a device which may be applied to engines of a specified type as either an original part or an aftermarket part without modification of other engine components.

It is a yet further object to provide means for enhancing the efficiency of an abrasive-excluding device by the inclusion of a filter media between the apparatus and the engine rear oil seal.

Yet another object is to provide a means for further enhancing the efficiency of an abrasive-excluding apparatus in use in particularly harsh environments by the incorporation of a scroll means.

According to a first aspect of the present invention, there is provided a flinger device for preventing the ingress of foreign matter to the vicinity on a side of a contact surface between a rotary shaft lubricant seal and its associated shaft, comprising: means to enable said device to be fitted to said shaft to rotate therewith; a flange portion having a first surface in a radially extending plane; and a wall means having an outer surface extending in an axial direction, wherein said device is arranged such that, when it is fitted on the shaft, the first surface of the flange portion locates closely adjacent to a generally radially extending outer end surface of a lubricant seal retaining means and the outer surface of the wall means locates closely adjacent to a generally axially extending inner surface of said seal retaining means.

Preferably, the wall means has a radially extending lip means thus forming a circumferentially extending channel between an inner surface of said lip means and the first surface of the flange portion.

Preferably also, a surface of the wall means has a layer of filter material affixed thereto of a predetermined dimension such that, when the device is fixed to the shaft, the filter material spans the small gap between the outer surface of the wall means and the inner surface of the seal retaining means.

Preferably further, the filter material comprises of woven polymer material.

Preferably yet further, the first surface of the flange portion is formed to have a scroll or scrolls therein.

Preferably, the direction of the scroll or scrolls is such that, on rotation of the device, said scroll or scrolls act to direct foreign matter away from the flange portion.

The means for fixing the device to the shaft may comprise a central aperture formed in the body of the device and having a diameter such that it forms a close fit on the shaft.

The device may be fabricated from a plastics material and may be fabricated by an injection molding process.

According to a second aspect of the present invention, there is provided a rotary shaft sealing system, comprising: a lubricant seal retaining means for retaining a lubricant seal on a shaft in contact with a surface thereof; and a flinger device for preventing the ingress of foreign matter to the vicinity of a side of a contact surface between the lubricant seal and the shaft, said flinger device comprising means to enable said device to be fitted to said shaft to rotate therewith; a flange portion having a first surface in a radially extending plane; and a wall means having an outer surface extending in an axial direction, said device being arranged such that, when it is fitted on said shaft, the first surface of the flange portion locates closely adjacent to a generally radially extending outer end surface of the lubricant seal retaining means and the outer surface of the wall means locates closely adjacent to a generally axially extending inner surface of said seal retaining means.

Preferably, the wall means has a radially extending lip means thus forming a circumferentially extending channel between an inner surface of said lip means and the first surface of the flange portion.

Preferably also, a surface of the wall means has a layer of filter material affixed thereto, said material having dimensions such that, when the device is fixed to the shaft, the filter material spans the small gap between the outer surface of the wall means and the inner surface of the seal retaining means.

According to a third aspect of the present invention, there is provided an engine including a rotatable shaft mounted therein, said shaft having a journalled or a flange portion at one end thereof, a lubricant seal retaining means for retaining a lubricant seal in contact with a bearing surface of said journalled or flange portion of the shaft and a flinger device for preventing the ingress of foreign matter to the vicinity on one side of said bearing surface, said flinger device comprising means to enable said device to be fitted to said shaft to rotate therewith; a flange portion having a first surface in a radially extending plane; and a wall means having an outer surface extending in an axial direction, wherein the first surface of the flange portion locates closely adjacent to a generally radially extending outer end surface of the lubricant seal retaining means and the outer surface of the wall means locates closely adjacent to a generally axially extending inner surface of said seal retaining means.

Preferably, the wall means has a radially extending lip means thus forming a circumferentially extending channel between an inner surface of said lip means and the first surface of the flange portion.

Preferably also, a surface of the wall means has a layer of filter material attached thereto which spans the gap between the outer surface of the wall means and the inner surface of the seal retaining means.

The seal retaining means may comprise a housing separable, from an end wall of the engine in which the end of the shaft is journalled.

Preferably, the engine is an internal combustion engine.

Preferably further, the shaft is an internal combustion engine crankshaft.

Preferably still further, the flinger device is formed integrally with an end of the crankshaft.

BRIEF DESCRIPTION OF THE DRAWINGS

By way of example, embodiments of the invention will be described with reference to the accompanying drawings of which

DESCRIPTION OF THE PREFERRED EMBODIMENTS

In the context of the present invention, the term "engine" includes any apparatus having a shaft rotatably mounted therein and having a radial lubricant seal associated with at least one end thereof to contain lubricant in the apparatus.

Figure 1:
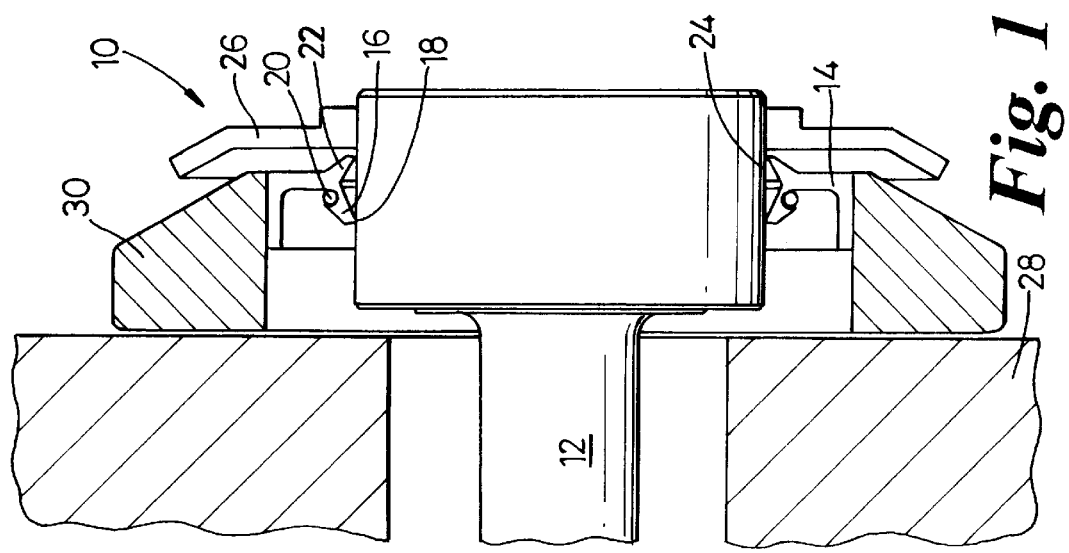
FIG. 1 is a cross-sectional view of a known oil seal and non-contacting flinger device.

Referring to the drawings, FIG. 1 shows a known oil seal and non-contacting flinger device 10 fitted to an engine crankshaft 12. The seal 14 is a housing-mounted, double-lipped, type in which a first lip 16 is in contact with a bearing surface 18 of the crankshaft 12, being held in contact by a radial spring 20. The first lip 16 faces in the direction of the material to be contained, typically oil in an internal combustion engine. The seal 14 has a second lip 22 facing away from the first lip 16 and in close proximity to, but not in contact with, the surface 24 of the crankshaft 12. A purpose of the second lip 22 is to protect the first lip 16, and the corresponding part surface 18 of the crankshaft 12 on which it bears, against abrasives.

The flinger device 10 shown in FIG. 1 is formed, typically, as a circular steel plate 26 carried on the crankshaft 12 or it may be an integral part of the crankshaft. The flinger device serves to throw abrasives or other foreign matter away from the relatively delicate seal by centrifugal action. In dirty environments, however, the flinger device is unable to properly protect the seal 14 and the surface (18,24) of the crankshaft, therefore wear occurs which may lead to oil leaking from the engine 28 and, possibly, dirt ingress into the engine. Abrasives encountered in dirty conditions may be very harsh, sand for example, and may be airborne or thrown up by the vehicle/implement (not shown) to which the engine is fitted. Abrasive dusts or slurries may also find their way to the vicinity of the seal whilst the vehicle/implement is stationary and the engine not running. In this known arrangement, the oil seal retaining housing 30 is removable from the engine 28.

Figure 2:
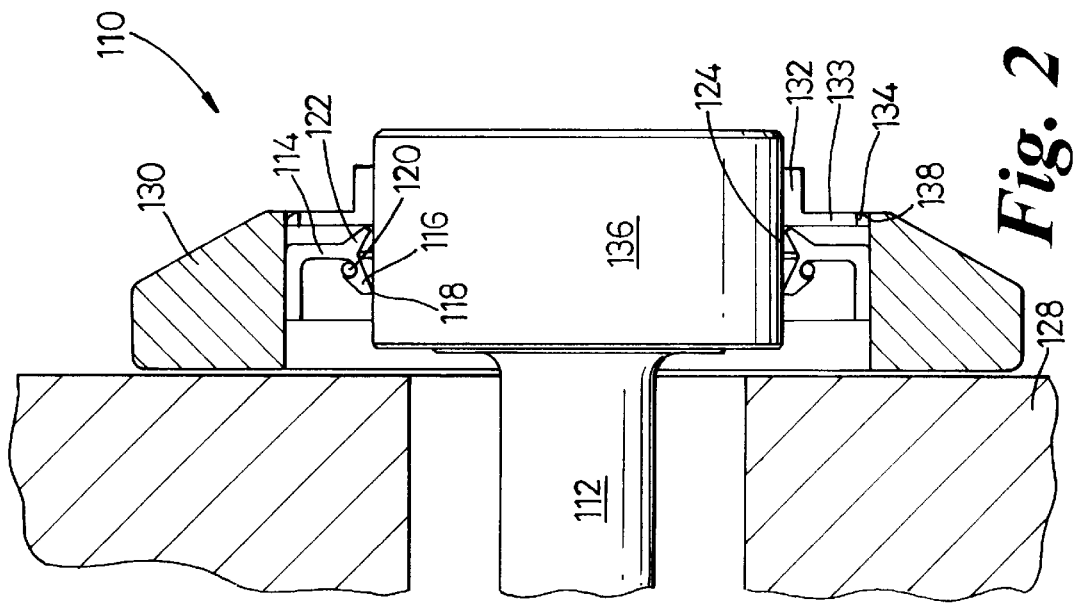
FIG. 2 is a cross-sectional view of a known oil seal and contact-type flinger device.

FIG. 2 shows a known apparatus for improving the protection of an engine rear oil seal and a bearing surface of a crankshaft from abrasive dust and slurries. In the following description of the known apparatus depicted by FIG. 2, like numerals prefixed by "1" will be used to denote like parts to the known apparatus of FIG. 1. A metal sleeve 132 of generally cylindrical form has a radially extending wall 133 which carries at a radially outward end an integral rubber lip 134. The sleeve 132 is mounted onto a rear flange 136 of the crankshaft 112 and therefore correspondingly rotates with it during engine running. The rubber lip 134 is in contact with an inner surface of the oil seal retaining housing 130 fitted to the engine 128. The apparatus serves to enclose the seal 114 and thus protect it from abrasives.

The arrangement of FIG. 2, schematically representing that disclosed on page 58 of the publication 'Design News' of Dec. 2, 1996, will be more effective than the open flinger device arrangement of FIG. 1. However, it has the disadvantage that the rubber lip 134 is directly exposed to abrasives in the external environment and may therefore itself suffer wear and the embedding of abrasive particles in the rubber lip. Thus, it will suffer a deterioration in its sealing effectiveness. Wear of the lip 134 may be exacerbated by the lack of lubrication in the vicinity of the lip.

Figure 3:
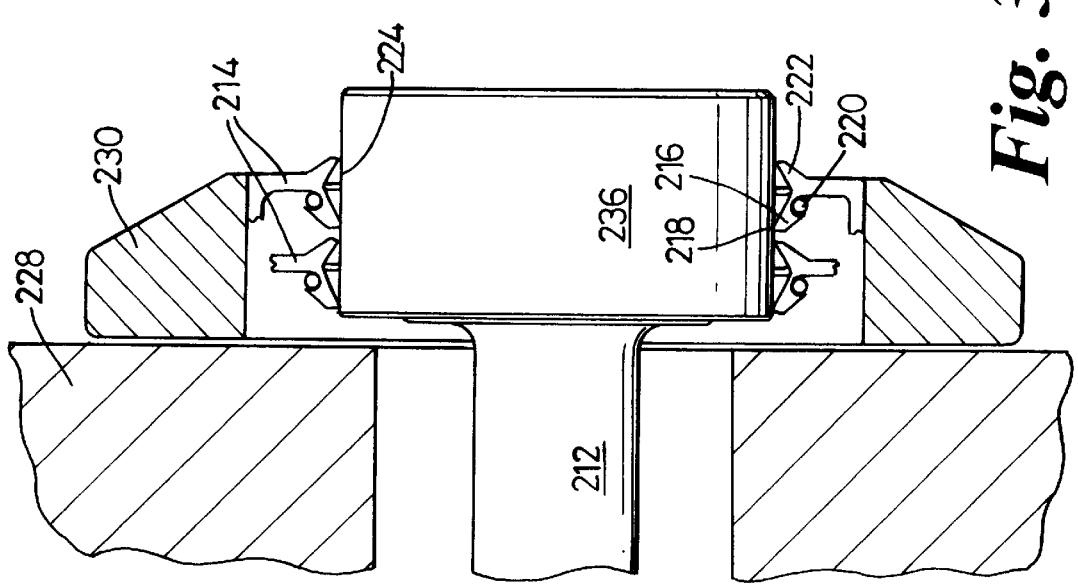
FIG. 3 is a cross-sectional view showing alternative axial oil seal positions in a specific type of engine before fitment with the apparatus of the present invention.

FIG. 3 shows a known arrangement for sealing the rear end of the crankshaft of an engine of a type represented by the Perkins 1000 Series and Perkins Phaser heavy duty four and six cylinder engines designed and manufactured by the present applicant. Once again, like numerals will be used to denote like parts but prefixed by "2". When these engines were designed, the possible need for crankshaft oil seals to be replaced after long or arduous duty was recognised. It is known that fitting a new oil seal 214 in a first position against a worn crankshaft surface cannot guarantee a proper seal against leakage, therefore provision is made on these engines for fitting the new seal 214 in a new second position, using a service tool (not shown) to position the seal squarely with reference to the retainer housing 230 and the crankshaft 212.

The apparatus of the present invention and its method of fitment to an engine in accordance with a first embodiment of the present invention will now be described in relation to FIG. 4. Once again, like number will be used to denote like parts but prefixed by "3". This shows a crankshaft and seal arrangement with the crankshaft 312 extending rearwards from the engine 328 and the oil seal 314 located in a retainer housing 330 attached to the engine 328. A flinger body 340, provided in the form of an annular plate 342 fitted onto a flange part 336 of the crankshaft 312, may be produced from a plastics material which will withstand the operating conditions and which will preferably enable the flinger body 340 to be push-fitted onto the crankshaft flange 336.

The flinger body 340 carries an annular wall 344 extending generally normal to a plane of the body, the wall 344 terminating in a lip 346 arranged perpendicularly to the wall. An outer surface 348 of the lip 346 is closely adjacent to but not contacting a corresponding inner surface 338 of the oil seal retainer housing 330. A first surface 350 of the flinger body 340 is also closely adjacent to but not contacting a corresponding outer surface 352 of the oil seal retainer housing 330. The air gaps thus provided will preferably each be in the region of 0.5 mm so that the flinger body 340, wall 344 and lip 346 act together with the adjacent surfaces (348,352) of the oil seal retainer housing 330 to provide a very narrow and directionally-changing pathway which foreign matter must negotiate to reach the vicinity of a bearing surface between the oil seal 314 and the crankshaft 312.

This pathway combined with the centrifugal effect induced in the air surrounding the rotating flinger device 310 will very effectively exclude abrasives from the vicinity of the oil seal and crankshaft bearing surface 318 during operation of the engine. A further advantage over the traditional 'open' flinger device of FIG. 1 is that abrasives and other foreign matter which may run down the engine whilst it is not running will be directed away from the oil seal by a channel 354 formed in the flinger body 340 between the plate 342 and the wall 344 and the lip 346, thus protection of the oil seal will still be effective. There are also no contacting parts to wear, in contrast to the rubber-lipped flinger device of FIG. 2. The inclusion of the channel 354 creates a further directional change in the pathway.

It may be necessary to provide one or more relief holes (not shown) through the flinger body 340 to avoid a pressure differential created by the centrifugal action of the flinger device 310 from drawing oil from the engine past the seal 314. Any depression relief hole must be of restricted diameter so as to avoid the ingress of dirt or abrasives. It may also be necessary, in this embodiment, to extend the retainer housing 330 axially outward by an amount sufficient to accommodate the flinger device 310.

Figure 4:
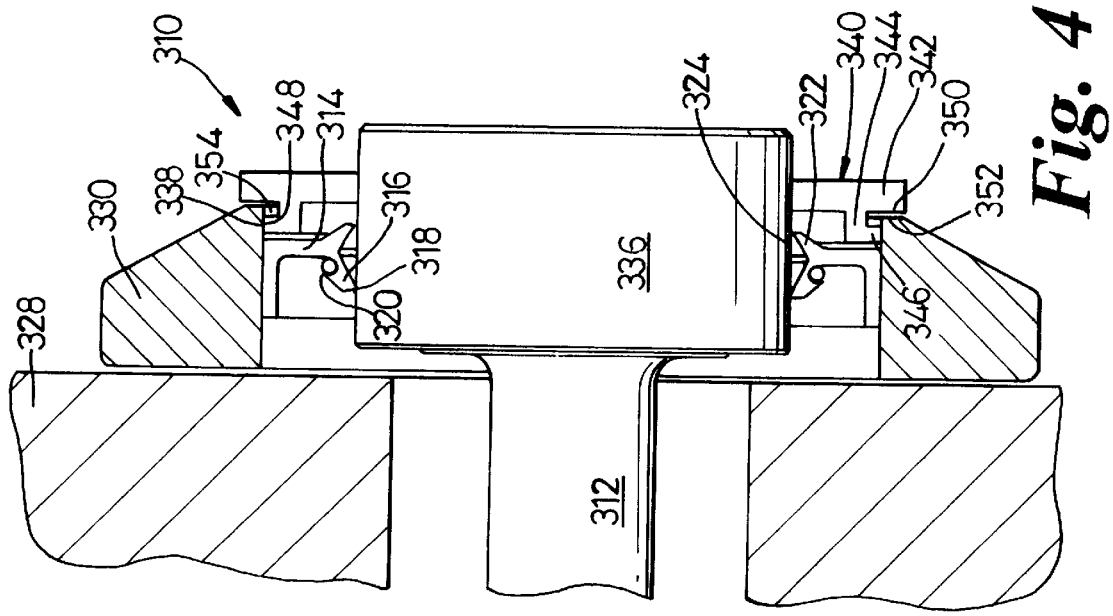
FIG. 4 is a cross-sectional view of an apparatus illustrating first and second embodiments of the present invention, but specifically a non-contacting labyrinth type flinger device fitted to an engine.

The arrangement shown in FIG. 4 also illustrates a second embodiment of the invention in which, by taking advantage of the reduction in oil seal and crankshaft wear that the present invention offers, an engine of the specific type described for FIG. 3, or any other type where suitable provision has been made for alternative oil seal positions, may be provided with the apparatus of the present invention without outwardly extending or otherwise modifying the oil seal retaining housing 330.

By relocating the oil seal 314 axially inwardly from the first position to the second position as shown in FIG. 3, the space gained within the oil seal retainer housing 330 can be used to accommodate the wall 344 and lip 346 of the flinger device 310 of the present invention and thus avoid increasing the length of the retainer housing 330. The inner surface of the oil seal housing 330 which was originally intended to provide the first oil seal position will instead provide a tightly controlled air gap in association with the lip 346 of the flinger body 340. The invention may therefore also allow for aftermarket fitment of the device 310 on engines where said engines have been either sold or later designated for duty in dirty environments.

To fit the apparatus to an engine as an aftermarket part, the oil seal retainer housing 330 may be removed from the engine 328 and the oil seal 314 inspected. If the oil seal shows any sign of wear or damage, it can be replaced. The seal 314 may then be moved to the second position using a service tool (not shown) and the retainer housing complete with seal then refitted to the engine, using a further service tool (not shown) to assist the lips (316,322) of the seal 314 to locate onto the crankshaft 312 without damage. The flinger device 310 may then be press-fitted onto the crankshaft 312 to a position adjacent a rear face 352 of the retainer housing and with a predetermined air gap of typically 0.5 mm.

Figure 5:
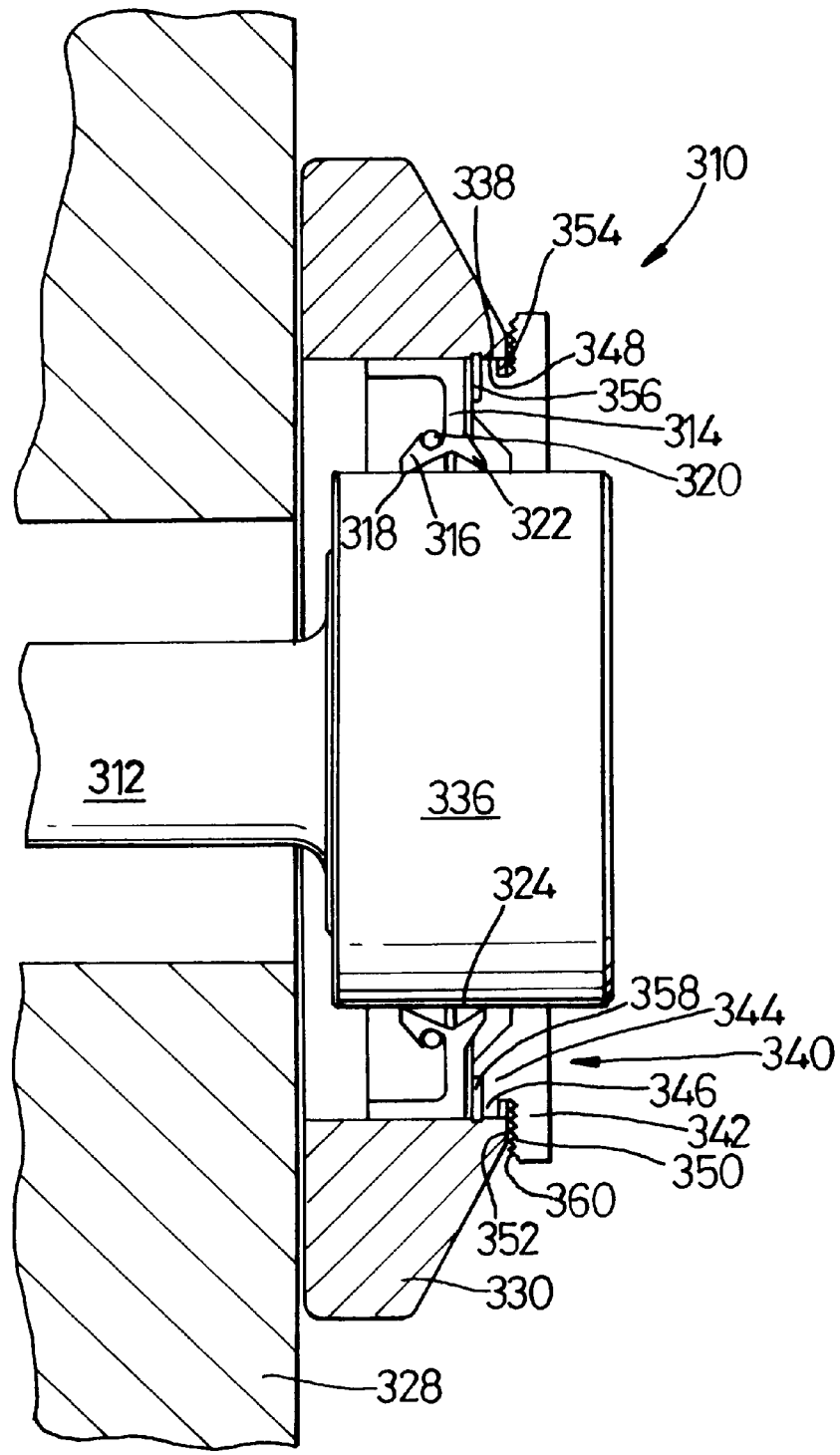
FIG. 5 is a cross-sectional view of the flinger device of the present invention fitted with a filter media in accordance with a third embodiment of the present invention. Also shown is a fourth embodiment in the form of a scroll introduced into a face of the flinger body.

A third embodiment of the invention is shown in FIG. 5. This embodiment includes a refinement to the device 310 for protecting the oil seal and crankshaft bearing surface 318 by providing a continuous strip 358 of woven polymer material held by adhesive to an end face of the flinger lip 46. An example of a suitable material is that brand-named 'vlies' and marketed by Freudenberg. The strip of material is dimensioned so that it is light contact with the inner face 338 of the oil seal retainer housing 330. The polymer strip 358 will filter out fine abrasive particles during both dynamic and static operation of the engine.

A fourth embodiment of the invention may also be seen in FIG. 5, this embodiment representing a further refinement to protection of the seal from abrasives. A scroll 360 is provided in the first surface 350 of the flinger body 340 adjacent the air gap, the direction of the scroll 360 being such that dirt or other foreign materials are directed away from the oil seal 314 during engine running. Incorporation of this embodiment may be desirable in extremely dirty environments in addition to the third embodiment. Alternatively, if it is preferred to avoid rubbing between adjacent surfaces of the polymer material 358 and the oil seal retainer housing 330, the apparatus of the fourth embodiment may be used in place of the third embodiment.

I claim:

1. A flinger device for preventing the ingress of foreign matter to the vicinity on a side of a contact surface between a rotary shaft lubricant seal and its associated shaft, comprising: means for enabling said flinger device to be fitted to said shaft to rotate therewith; a flange portion having a first surface in a radially extending plane; and a wall having an outer surface extending in an axial direction, wherein said flinger device is arranged such that, when it is fitted on the shaft, the first surface of the flange portion locates closely adjacent to a generally radially extending outer end surface of a lubricant seal retainer and the outer surface of the wall locates closely adjacent to a generally axially extending inner surface of said seal retainer, wherein a surface of the wall has a layer of filter material affixed thereto of a predetermined dimension such that, when said flinger device is fixed to the shaft, the filter material spans a small gap between the outer surface of said wall and an inner surface of the seal retainer.

2. A flinger device as claimed in claim 1, wherein the wall comprises a radially extending lip having an inner axial surface that is spaced axially from the first surface of said flange portion to form a circumferentially extending channel between said inner axial surface of said lip and the first surface of the flange portion.

3. A flinger device as claimed in claim 1, wherein the filter material comprises of woven polymer material.

4. A flinger device as claimed in claim 1, wherein the first surface of the flange portion is formed to have a scroll or scrolls therein.

5. A flinger device as claimed in claim 4, wherein the direction of the scroll or scrolls is such that, on rotation of the flinger device, said scroll or scrolls act to direct foreign matter away from the flange portion.

6. A flinger device as claimed in claim 1, wherein the means for enabling the flinger device to be fitted to the shaft comprises a central aperture formed in the body of the flinger device and having a diameter such that it forms a close fit on the shaft.

7. A flinger flinger device as claimed in claim 6, wherein the device is fabricated from a plastics material.

8. A flinger flinger device as claimed in claim 7, wherein the device is fabricated by an injection molding process.

9. A rotary shaft sealing system, comprising: a lubricant seal; a lubricant seal retainer that is configured to retain the lubricant seal on a shaft in contact with a surface thereof; and a flinger device that is configured to prevent the ingress of foreign matter to the vicinity of a side of a contact surface between the lubricant seal and the shaft, said flinger device comprising (1) means for enabling said flinger device to be fitted to said shaft to rotate therewith, (2) a flange portion having a first surface in a radially extending plane, and (3) a wall having an outer radial surface extending in an axial direction, said flinger device being arranged such that, when it is fitted on said shaft, the first surface of the flange portion locates closely adjacent to a generally axially extending inner surface of said seal retainer, wherein said inner radial surface of said seal retainer is capable of selectively retaining said lubricant seal in at least first and second axially-spaced positions thereon so as to permit said lubricant seal to be relocated axially inwardly along said seal retainer during a retrofit installation of said flinger device on said shaft, and wherein an outer radial surface of said wall and an outer radial surface of said lubricant seal are of generally equal diameter so as to permit said flinger device to be located, at least in part, within said first location after said lubricant seal is relocated from said first location to said second location.

10. A system as claimed in claim 9, wherein the outer radial surface of the wall comprises a radially extending lip having an inner axial surface that is spaced axially from the first surface of said flange portion to form a circumferentially extending channel between said inner axial surface of said lip and the first surface of the flange portion.

11. A system as claimed in claim 9, wherein said first and second positions on said inner radial surface of said seal retainer are formed from a portion of said inner radial surface which extends at least generally axially from said first location to said second location.

12. A sealing system comprising: a lubricant seal; a lubricant seal retainer that is configured to retain the lubricant seal on a shaft in contact with a surface thereof; and a flinger device that is configured to prevent the ingress of foreign matter to the vicinity of a side of a contact surface between the lubricant seal and the shaft, said flinger device comprising (1) means for enabling said flinger device to be fitted to said shaft to rotate therewith, (2) a flange portion having a first surface in a radially extending plane, and (3) a wall having an outer surface extending in an axial direction, said flinger device being arranged such that, when it is fitted on said shaft, the first surface of the flange portion locates closely adjacent to a generally axially extending inner surface of said seal retainer, wherein a surface of the wall has a layer of filter material affixed thereto, said material having dimensions such that, when the flinger device is fitted to the shaft, the filter material spans a small gap between the outer surface of the wall and the inner surface of the seal retainer.

13. An engine including: a rotatable shaft, said shaft having a journalled or a flange portion at one end thereof; a lubricant seal; a lubricant seal retainer which retains said lubricant seal in contact with a bearing surface of said journalled or flange portion of the shaft; and a flinger device which prevents the ingress of foreign matter to the vicinity on one side of said bearing surface, said flinger device being fitted to said shaft so as to rotate therewith and including (1) a flange portion having a first surface in a radially extending plane and (2) a wall having an outer radial surface extending in an axial direction, wherein the first surface of the flange portion locates closely adjacent to a generally radially extending outer end surface of the seal retainer and the outer radial surface of the wall locates closely adjacent to an inner radial surface of said seal retainer, wherein said inner radial surface of said seal retainer extends at least generally axially of said shaft from said outer end thereof to a portion thereof which is spaced axially inwardly of said lubricant seal so as to permit said lubricant seal to be relocated axially inwardly along said seal retainer during a retrofit installation of said flinger device on said shaft, and wherein an outer radial surface of said wall and an outer radial surface of said lubricant seal are of generally equal diameter so as to permit said flinger device to be located, at least in part, within a space vacated by said lubricant seal after said lubricant seal is relocated axially inwardly along said seal retainer during the retrofit installation of said flinger device.

14. An engine as claimed in claim 13, wherein the outer radial surface of the wall comprises a radially extending lip having an inner axial surface that is spaced axially from the first surface of said flange portion to form a circumferentially extending channel between said inner axial surface of said lip and the first surface of the flange portion.

15. An engine as claimed claim 13, wherein the engine is an internal combustion engine.

16. An engine as claimed in claim 15, wherein the shaft is a crankshaft.

17. An engine including: a rotatable shaft, said shaft having a journalled or a flange portion at one end thereof; a lubricant seal; a lubricant seal retainer which retains said lubricant seal in contact with a bearing surface of said journalled or flange portion of the shaft; and a flinger device which prevents the ingress of foreign matter to the vicinity on one side of said bearing surface, said flinger device being fitted to said shaft so as to rotate therewith and including (1) a flange portion having a first surface in a radially extending plane and (2) a wall having an outer surface extending in an axial direction, wherein the first surface of the flange portion locates closely adjacent to a generally radially extending outer end surface of the seal retainer and the outer surface of the wall locates closely adjacent to a generally axially extending inner surface of said seal retainer, wherein a surface of the wall has a layer of filter material attached thereto which spans a gap between the outer surface of the wall and the inner surface of the seal retainer.

18. An engine as claimed in claim 15, wherein the seal retainer comprises a housing separable from an end wall of the engine in which the end of the shaft is journalled.

19. An engine as claimed in claim 16, wherein the flinger device is formed integrally with an end of the crankshaft.

20. A method of retrofitting an engine with a flinger device, said method comprising:
   (A) providing an engine including (1) a rotatable shaft having a bearing surface, (2) a lubricant seal, and (3) a lubricant seal retainer which retains said lubricant seal in sealing contact with said bearing surface of said shaft;
   (B) providing a flinger device configured to prevent the ingress of foreign matter to the vicinity of said bearing surface of said shaft, said flinger device including (1) a flange portion having a first surface extending at least generally in a radially extending plane, and (2) a wall having an outer radial surface extending in an axial direction, wherein said outer radial surface of said wall and an outer radial surface of said lubricant seal are of substantially equal diameter;
   (C) relocating said lubricant seal axially inwardly along said seal retainer from a first position on an inner radial surface of said seal retainer to a second position on said inner radial surface of said seal retainer while maintaining sealing contact between said lubricant seal and said bearing surface of said shaft; and then (D) fitting said flinger device to said shaft in a location which is located, at least in part, at said first position on said inner radial surface of said seal retainer and in which the first surface of said flange portion locates closely adjacent to a generally radially extending outer end surface of said seal retainer and the outer radial surface of said wall locates closely adjacent to said inner radial surface of said seal retainer.

21. A method as claimed in claim 20, wherein the relocating step comprises moving said lubricant seal axially along an axially-extending portion of said inner radial surface of said seal retainer that extends from said first position to said second position.

* * * * *